(12) United States Patent
Zähe

(10) Patent No.: US 10,781,934 B2
(45) Date of Patent: Sep. 22, 2020

(54) VALVE SOLENOID TUBE HAVING A TWO CHAMBER CONFIGURATION

(71) Applicant: Sun Hydraulics, LLC, Sarasota, FL (US)

(72) Inventor: Bernd Zähe, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 126 days.

(21) Appl. No.: 16/019,820

(22) Filed: Jun. 27, 2018

(65) Prior Publication Data

US 2020/0003324 A1 Jan. 2, 2020

(51) Int. Cl.
| | | |
|---|---|---|
| F15B 13/04 | (2006.01) | |
| F16K 31/06 | (2006.01) | |
| F16K 31/10 | (2006.01) | |
| F15B 13/044 | (2006.01) | |
| F15B 13/043 | (2006.01) | |

(52) U.S. Cl.
CPC ...... F16K 31/0613 (2013.01); F15B 13/0435 (2013.01); F15B 13/0442 (2013.01); F16K 31/0606 (2013.01); F16K 31/105 (2013.01)

(58) Field of Classification Search
CPC .............. F15B 13/0435; F15B 13/0442; F15B 13/0405; F15B 13/044; F15B 13/024; F15B 13/0426; F16K 31/0613; F16K 31/0606; F16K 27/029
See application file for complete search history.

(56) References Cited

U.S. PATENT DOCUMENTS

| | | | | |
|---|---|---|---|---|
| 4,245,667 A | * | 1/1981 | Braukmann | F16K 17/085 137/493 |
| 4,544,128 A | * | 10/1985 | Kolchinsky | F16K 31/408 251/129.03 |
| 4,741,364 A | * | 5/1988 | Stoss | F15B 13/0402 137/625.64 |
| 5,423,347 A | * | 6/1995 | Weber | F15B 13/015 137/102 |
| 5,730,174 A | * | 3/1998 | Mismas | F15B 13/044 137/269 |
| 9,791,063 B2 | * | 10/2017 | Querejeta Andueza | F16K 31/56 |
| 2014/0026985 A1 | * | 1/2014 | Aranovich | F15B 13/0405 137/455 |
| 2016/0109028 A1 | * | 4/2016 | Querejeta Andueza | F23N 1/00 137/78.1 |

* cited by examiner

Primary Examiner — Kelsey E Cary
(74) Attorney, Agent, or Firm — McDonnell Boehnen Hulbert & Berghoff LLP

(57) ABSTRACT

An example solenoid tube of a solenoid actuator for a valve includes: (i) a cylindrical body includes: a first threaded region formed on an exterior peripheral surface of the cylindrical body, and a second threaded region formed on an interior peripheral surface of the cylindrical body; and (ii) a pole piece formed as a protrusion from the interior peripheral surface of the cylindrical body and configured to divide a hollow interior of the cylindrical body into a first chamber and a second chamber, where the pole piece defines a channel therethrough, such that the channel fluidly couples the first chamber to the second chamber, where the first chamber is configured to receive an armature of the solenoid actuator therein, and where the second chamber is configured to a component such as a sensor or a manual actuator therein.

9 Claims, 8 Drawing Sheets

VALVE SOLENOID TUBE HAVING A TWO CHAMBER CONFIGURATION

BACKGROUND

A hydraulic valve directs the flow of a liquid medium, usually oil, through a hydraulic system. The direction of the oil flow is determined by the position of a spool or a poppet. An example valve may have a movable element inside a housing or sleeve. For instance, the valve may include a poppet that is movable by an actuation mechanism (e.g., electric, hydraulic, pneumatic, or manual). The poppet may be seated on a valve seat formed inside the housing. Once the valve is actuated, the poppet moves off the seat to allow flow around the poppet from a first port to a second port.

The valve can be manually, hydraulically, or electrically actuated. The valve can be electrically actuated via a solenoid actuator, for example. In some cases, a valve can be configured differently based on configurations of various hydraulic systems in which the valve can be used. Thus, it may be desirable to have a solenoid actuator capable of accommodating different components to achieve different functionalities.

SUMMARY

The present disclosure describes implementations that relate to a valve solenoid tube having a two chamber configuration.

In a first example implementation, the present disclosure describes a solenoid tube of a solenoid actuator for a valve. The solenoid tube includes: (i) a cylindrical body comprising: (a) a first threaded region formed on an exterior peripheral surface of the cylindrical body and disposed at a distal end thereof, wherein the first threaded region is configured to engage threads of a housing of the valve to couple the solenoid tube to the housing, and (b) a second threaded region formed on an interior peripheral surface of the cylindrical body and disposed at a proximal end thereof, wherein the second threaded region is configured to engage respective threads of a body of a sensor to couple the sensor to the solenoid tube; (ii) a first chamber defined within the cylindrical body, wherein the first chamber is configured to receive an armature of the solenoid actuator therein; (iii) a second chamber defined within the cylindrical body, wherein the second chamber is configured to receive, at least a portion of, the body of the sensor therein; and (iv) a pole piece formed as a protrusion from the interior peripheral surface of the cylindrical body, wherein the pole piece is disposed between the first chamber and the second chamber, and wherein the pole piece defines a channel therethrough, such that the channel fluidly couples the first chamber to the second chamber.

In a second example implementation, the present disclosure describes a valve. The valve includes: (i) a main valve section comprising: (a) a housing having threads disposed on an interior peripheral surface of the housing, and (b) a movable element configured to move axially within the housing; (ii) a solenoid actuator comprising: (a) a solenoid tube having a cylindrical body, wherein the cylindrical body comprises a first threaded region formed on an exterior peripheral surface of the cylindrical body and disposed at a distal end thereof, wherein the first threaded region engages the threads of the housing to couple the solenoid tube to the housing, wherein the cylindrical body comprises a second threaded region formed on a respective interior peripheral surface of the cylindrical body and disposed at a proximal end thereof, wherein the cylindrical body comprises a pole piece formed as a protrusion from the respective interior peripheral surface of the cylindrical body, wherein the pole piece divides a hollow interior of the cylindrical body into a first chamber and a second chamber, and wherein the pole piece defines a channel therethrough, such that the channel fluidly couples the first chamber to the second chamber, (b) an armature disposed in the first chamber and configured to be coupled to the movable element of the main valve section, and (c) a solenoid coil disposed about the exterior peripheral surface of the cylindrical body; and (iii) a sensor having a body disposed, at least partially, in the second chamber of the cylindrical body of the solenoid tube, wherein the body of the sensor has respective threads disposed on a respective exterior peripheral surface of the body of the sensor, wherein the second threaded region of the cylindrical body of the solenoid tube engages the respective threads of the body of the sensor to couple the sensor to the solenoid tube.

In a third example implementation, the present disclosure describes another valve. The valve includes: (i) a main valve section comprising: (a) a housing having threads disposed on an interior peripheral surface of the housing, and (b) a movable element configured to move axially within the housing; (ii) a solenoid actuator comprising: (a) a solenoid tube having a cylindrical body, wherein the cylindrical body comprises a first threaded region formed on an exterior peripheral surface of the cylindrical body and disposed at a distal end thereof, wherein the first threaded region engages the threads of the housing to couple the solenoid tube to the housing, wherein the cylindrical body comprises a second threaded region formed on a respective interior peripheral surface of the cylindrical body and disposed at a proximal end thereof, wherein the cylindrical body comprises a pole piece formed as a protrusion from the respective interior peripheral surface of the cylindrical body, wherein the pole piece divides a hollow interior of the cylindrical body into a first chamber and a second chamber, and wherein the pole piece defines a channel therethrough, such that the channel fluidly couples the first chamber to the second chamber, (b) an armature disposed in the first chamber and configured to be coupled to the movable element of the main valve section, and (c) a solenoid coil disposed about the exterior peripheral surface of the cylindrical body; and (iii) a manual actuator having: (a) a sleeve disposed, at least partially, in the second chamber of the cylindrical body of the solenoid tube, wherein the sleeve has respective threads disposed on a respective exterior peripheral surface of the sleeve, wherein the second threaded region of the cylindrical body of the solenoid tube engages the respective threads of the sleeve to couple the manual actuator to the solenoid tube, and a (b) a pin disposed through the channel of the pole piece and configured to contact the armature.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

In examples, a valve may have a poppet that is seated on a seat formed as a protrusion from an interior peripheral surface of a cage, sleeve, valve body, or housing. When the valve is actuated, the poppet is unseated and moves within the valve body to form a gap between an exterior peripheral surface of the poppet and the seat, thereby allowing fluid to flow from an inlet through the gap to an outlet. The valve may be a proportional valve where an axial position of the poppet affects the amount the flow rate across the valve for a given pressure drop between the inlet and the outlet.

In examples, the valve can be electrically-actuated and the poppet can be unseated using a force applied by a solenoid actuator thereon. An electrically-actuated valve can be adapted to have different configurations to allow the valve to achieve different functionalities. For example, despite being electrically-actuated, it may be desirable to have a manual-override feature to allow manual actuation of the valve in the case of a solenoid failure. In another example, it may be desirable to have a manual adjustment mechanism configured to vary a preload force on a spring against which the solenoid actuator acts. This way, making an adjustment through the manual adjustment actuator can change the command signal to the solenoid at which the valve "cracks" open. In another example, it may be desirable to configure the valve with a pressure and/or position sensor configured to provide pressure or position information to a controller of the hydraulic system that includes the valve. The controller can then send commands to various components of the hydraulic system and to the solenoid coil of the valve based on the sensor information.

As such, it may be desirable to have a versatile solenoid actuator that can accommodate different components (e.g., manual override feature, manual adjustment actuator, sensors, etc.) and allow a valve to be configured in various ways. Disclosed herein is a solenoid tube configured to be coupled to a housing of the valve, while also being configured to accommodate various mechanisms and components to ascribe different functionalities to the valve.

Figure 1:
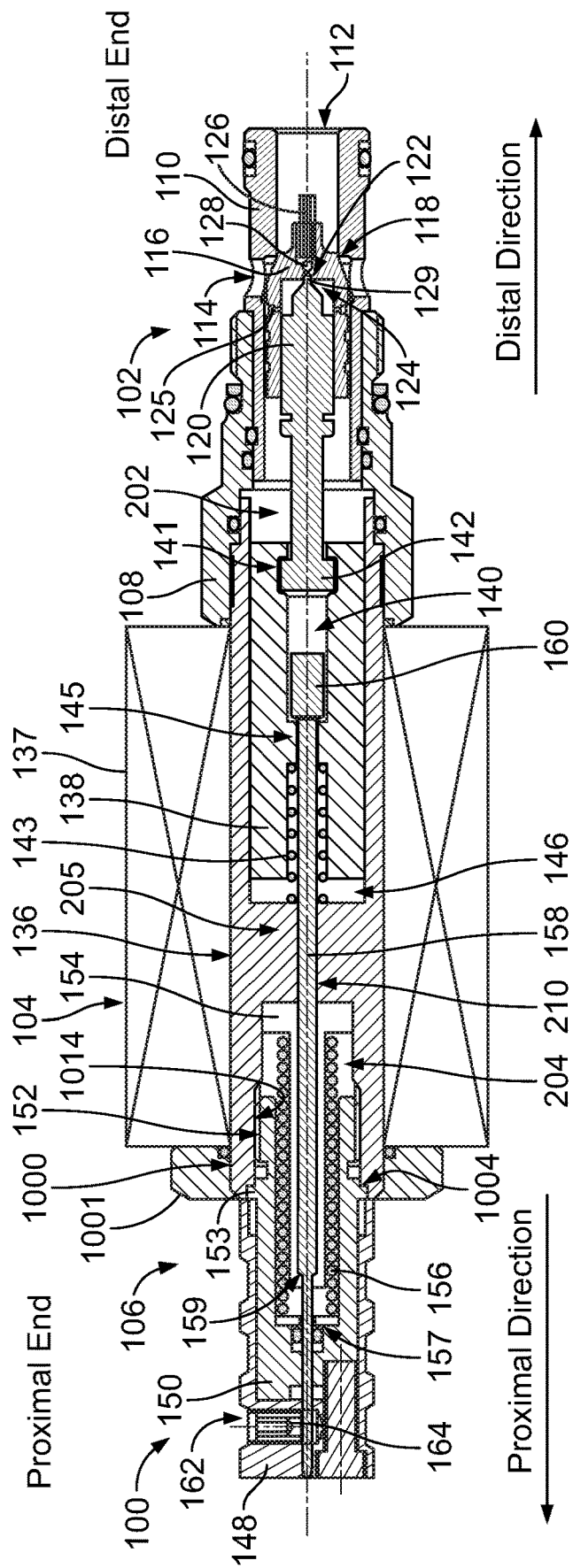
FIG. 1 illustrates a cross-sectional side view of a valve in a closed position, in accordance with an example implementation.

FIG. 1 illustrates a cross-sectional side view of a valve 100 in a closed position, in accordance with an example implementation. The valve 100 may include a main valve section 102, a pull-type solenoid actuator 104, and a pull-type manual actuator 106. The valve 100 is used herein as an example to illustrate configuration of a solenoid tube. However, it should be understood that the solenoid tube disclosed herein can be used with other valves and valve types. Further, although the solenoid actuator described herein is a pull-type solenoid actuator, the solenoid tube described herein can be used with a push-type solenoid actuator as well.

The main valve section 102 includes a housing 108 that defines a longitudinal cylindrical cavity therein. The longitudinal cylindrical cavity of the housing 108 is configured to receive at a distal end thereof a cage or sleeve 110 coaxial with the housing 108. The sleeve 110 defines a first port 112 and a second port 114. The first port 112 is defined at a nose of the sleeve 110, whereas the second port 114 may be defined as holes disposed in a radial array about an exterior surface of the sleeve 110. The valve 100 is configured to control flow of fluid between the second port 114 and the first port 112.

The sleeve 110 defines a longitudinal cylindrical cavity therein, and a first poppet 116 is disposed in the longitudinal cylindrical cavity defined within the sleeve 110, where the first poppet 116 is coaxial with the housing 108 and the sleeve 110. The first poppet 116 can also be referred to as a main or primary poppet.

In the closed position shown in FIG. 1, the first poppet 116 is seated on a seat 118 defined by an interior peripheral surface of the sleeve 110. The first poppet 116 has a tapered circumferential surface that contacts the seat 118 when the first poppet 116 is seated.

The first poppet 116 defines a respective longitudinal cylindrical cavity therein. A second poppet 120 is disposed in the longitudinal cylindrical cavity defined within the first poppet 116, and the second poppet 120 is coaxial with the housing 108, the sleeve 110, and the first poppet 116. The second poppet 120 may also be referred to as a dart or secondary poppet.

In the closed position shown in FIG. 1, the second poppet 120 is seated on a seat 122 defined by an interior peripheral surface of the first poppet 116. The second poppet 120 has a respective tapered circumferential surface that contacts the seat 122 when the second poppet 120 is seated. Further, a chamber 124 is defined within the first poppet 116 between an exterior peripheral surface of the second poppet 120 and the interior peripheral surface of the first poppet 116. During operation of the valve 100, pressurized fluid received at the second port 114 is communicated through a pilot feed orifice 125 disposed in the first poppet 116 to the chamber 124.

The valve 100 further includes a roll pin 126 coupled to a ball 128 (e.g., a metal sphere) that operates as a check valve. The roll pin 126 and the ball 128 are disposed within the first poppet 116 at a nose section or a distal end thereof. The ball 128 blocks a longitudinal passage or longitudinal channel 129 defined in the distal end of the first poppet 116, and thus the ball 128 blocks fluid flow from the first port 112 through the nose section of the first poppet 116 and the longitudinal channel 129 to the chamber 124 when the second poppet 120 is unseated. However, when the second poppet 120 is unseated, fluid can flow from the chamber 124 though the longitudinal channel 129, pushing the ball 128 and the roll pin 126, and then flows to the first port 112.

The second poppet 120 is configured to move axially in the longitudinal cylindrical cavity defined within the first poppet 116 when the valve 100 is actuated by any type of actuation mechanisms. As depicted in FIG. 1, the valve 100 includes the pull-type solenoid actuator 104 configured to move the second poppet 120.

The pull-type solenoid actuator 104 includes a solenoid tube 136 disposed within and received at a proximal end of the housing 108, such that the solenoid tube 136 is coaxial with the housing 108. A solenoid coil 137 can be disposed about an exterior surface of the solenoid tube 136.

Figure 2:
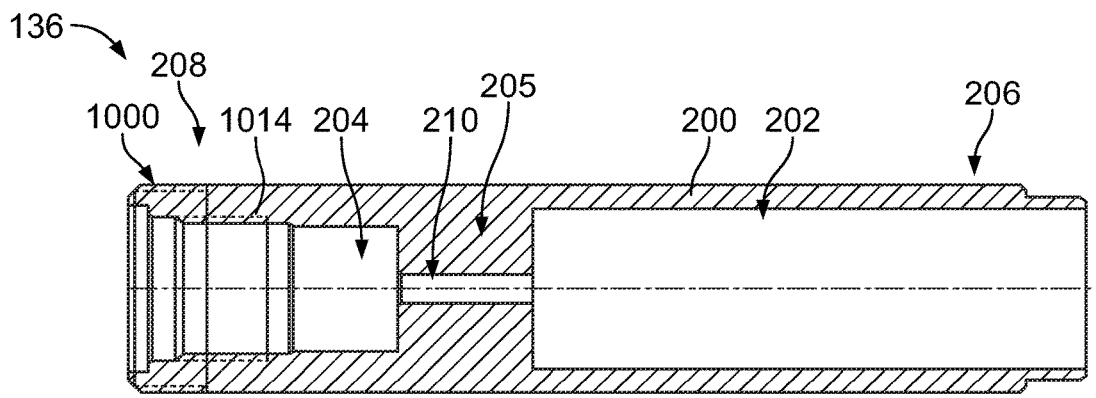
FIG. 2 illustrates a cross-sectional view of a solenoid tube, in accordance with an example implementation.

FIG. 2 illustrates a cross-sectional view of the solenoid tube 136, in accordance with an example implementation. As described below, the solenoid tube 136 renders the valve 100 versatile. Particularly, the solenoid tube 136 is configured to be coupled to the housing 108 and also be coupled to a variety of components to impute different functionalities to a given valve (e.g., the valve 100).

As depicted, the solenoid tube 136 has a cylindrical body 200 defining therein a first chamber 202 within a distal side of the cylindrical body 200 and a second chamber 204 within a proximal side of the cylindrical body 200. The solenoid tube 136 includes a pole piece 205 formed as a protrusion from an interior peripheral surface of the cylindrical body 200. The pole piece 205 separates the first chamber 202 from the second chamber 204. In other words, the pole piece 205 divides a hollow interior of the cylindrical body 200 into the first chamber 202 and the second chamber 204. Further, the pole piece 205 is composed of material of high magnetic permeability.

The solenoid tube 136 has a distal end 206 configured to be coupled to the housing 108. The solenoid tube 136 also has a proximal end 208 configured to be coupled to a variety of components to impute different functionalities to a given valve.

Figure 3:
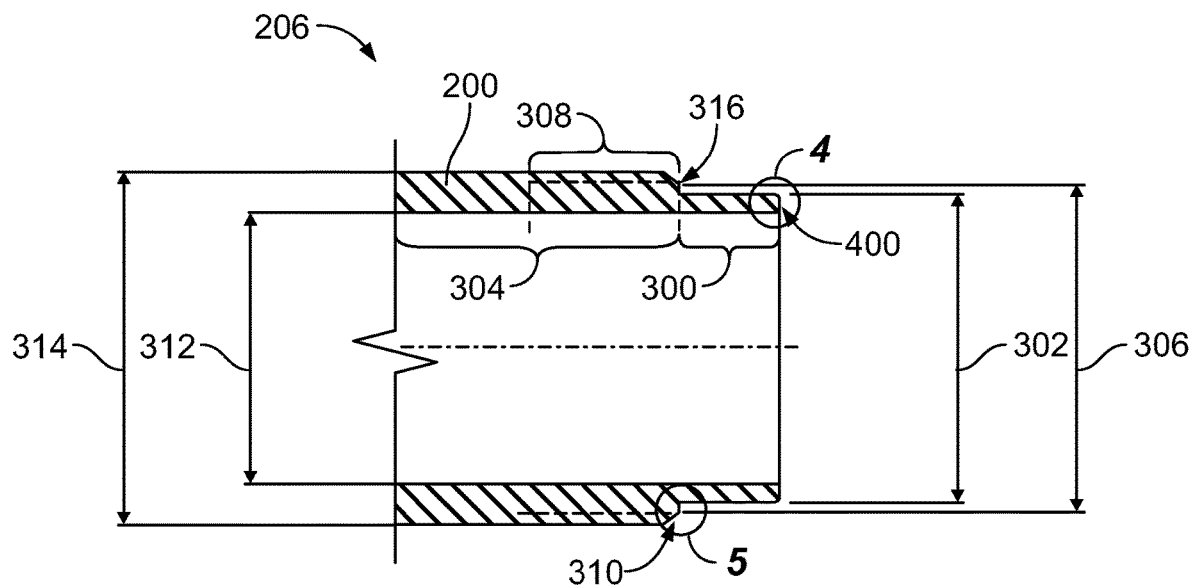
FIG. 3 illustrates a cross-sectional view of a distal end of a solenoid tube, in accordance with an example implementation.

FIG. 3 illustrates a cross-sectional view of the distal end 206 of the solenoid tube 136, in accordance with an example implementation. The distal end 206 is configured to be inserted into the housing 108 of the valve 100. The distal end 206 has a first portion 300 with a first diameter 302 and a second portion 304 with a second diameter 306 that is larger than the first diameter 302. The second portion 304 includes a threaded region 308. The distal end 206 of the solenoid tube 136 further includes a locating shoulder 310 between the first portion 300 and the second portion 304 of the distal end 206. The locating shoulder 310 is arranged at a position where the first diameter 302 changes to the second diameter 306. The locating shoulder 310 is adjacent the threaded region 308, for example.

The distal end 206 has an internal tube diameter 312 and an external tube diameter 314. In some examples, the second portion 304 may be about twice as long as the first portion 300, such that when inserted into the housing 108, a length of the second portion 304 inserted into the housing 108 is twice as long as a length of the first portion 300. In addition, as shown in FIG. 3, the second diameter 306 can be defined to extend to a root 316 of threads of the threaded region 308 of the second portion 304.

Figure 4:
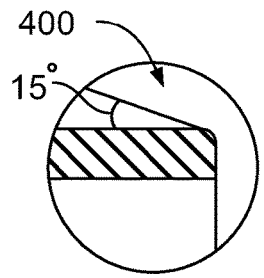
FIG. 4 illustrates a magnified view of a tapered end of a first portion of a distal end of a solenoid tube, in accordance with another example implementation.

FIG. 4 illustrates a magnified view of a tapered end 400 of the first portion 300 of the distal end 206, in accordance with an example implementation. The first portion 300 is at an opening of the distal end 206 and is configured to be inserted into the housing 108 ahead of the second portion 304, and the first portion 300 includes the tapered end 400, which will abut the housing 108 after insertion.

Figure 5:
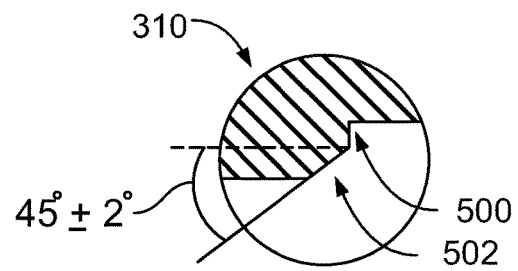
FIG. 5 illustrates a magnified view of a locating shoulder of a distal end of a solenoid tube, in accordance with an example implementation.

FIG. 5 illustrates a magnified view of the locating shoulder 310 of the distal end 206 of the solenoid tube 136, in accordance with an example implementation. The locating shoulder 310 includes a corner 500 defined by the first diameter 302 changing to the second diameter 306. The corner 500 is shown as a 90° corner for an abrupt change in the diameter; however, a less abrupt change may be used. The locating shoulder 310 also includes a tapered portion 502 abutting the corner 500 and leading into threads of the threaded region 308 of the second portion 304. The locating shoulder 310 enables alignment of the solenoid tube 136 with the housing 108.

Figure 6:
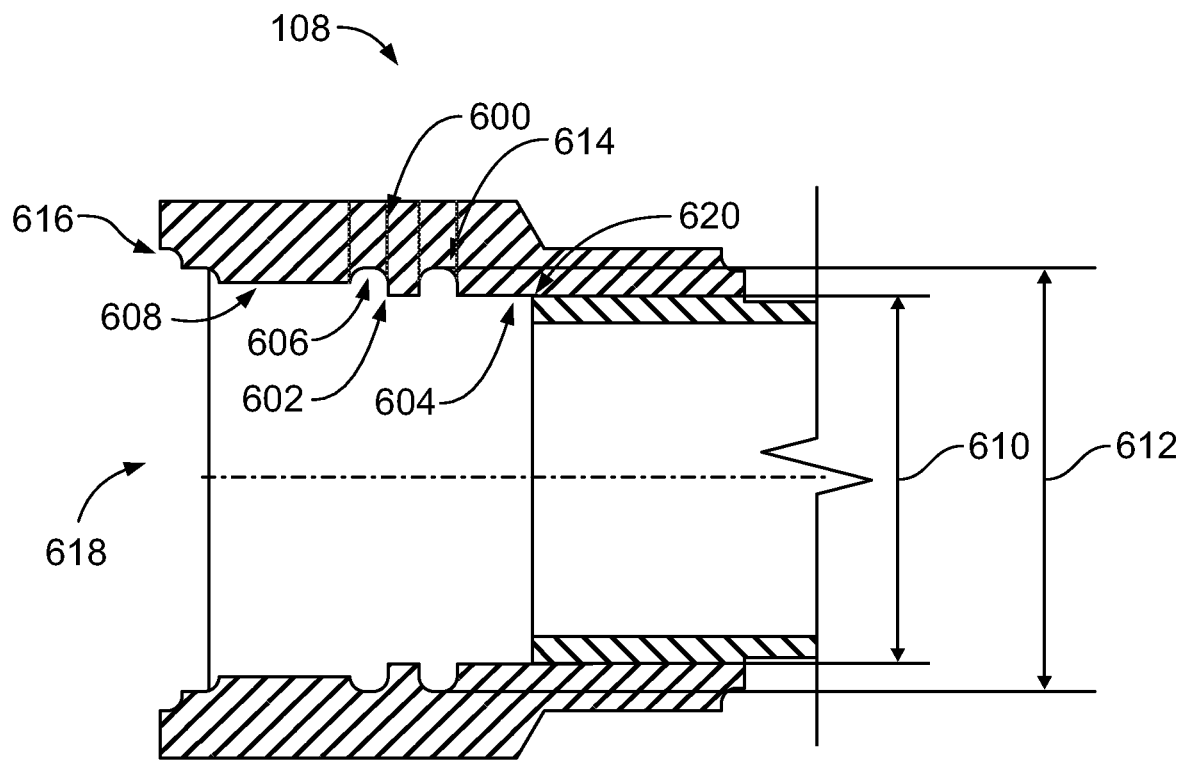
FIG. 6 illustrates a cross-sectional view of a respective proximal end of a housing of a valve, in accordance with an example implementation.

FIG. 6 illustrates a cross-sectional view of a respective proximal end of the housing 108 of the valve 100, in accordance with an example implementation. The housing 108 has an arm 600 on which a housing locating shoulder 602 is configured as a protrusion from an interior peripheral surface 604 of the housing 108. The housing locating shoulder 602 serves at a stop for insertion of the distal end 206 of the solenoid tube 136, such that when the distal end 206 of the solenoid tube 136 is inserted and screwed into the housing 108, the locating shoulder 310 of the distal end 206 mates with the housing locating shoulder 602 of the housing 108 to enable alignment of the housing 108 and the solenoid tube 136.

The housing 108 also includes a recess 606 into which the locating shoulder 310 of the distal end 206 can be positioned when inserted into the housing 108, for example, such that the locating shoulder 310 abuts the housing locating shoulder 602.

The housing 108 includes internal threads 608 along a portion of the interior peripheral surface 604, adjacent to the recess 606, that mate with threads of the threaded region 308 of the second portion 304 of the distal end 206 of the solenoid tube 136. A length of the internal threads 608 matches a length of the threaded region 308 of the distal end 206 of the solenoid tube 136.

The housing 108 also has a first internal diameter 610 that is large enough to accommodate the first diameter 302 of the distal end 206 of the solenoid tube 136. The housing 108 also has a second internal diameter 612 that is large enough to accommodate the second diameter 306 of the distal end 206 of the solenoid tube 136.

The housing 108 includes a groove 614 disposed in the interior peripheral surface 604 of the housing 108 and adjacent the housing locating shoulder 602. A seal may then be positioned in the groove 614, circumferential to the distal end 206 of the solenoid tube 136 when the solenoid tube 136 is inserted into the housing 108.

The housing 108 further includes a recess 616 disposed in the interior peripheral surface 604 of the housing 108 and adjacent an opening 618 of the housing 108. Another seal may then also be positioned in the recess 616, circumferential to the second portion 304 of the distal end 206 of the solenoid tube 136 when the solenoid tube 136 is inserted into the housing 108.

The housing 108 further includes a corner 620 that may abut with the tapered end 400 of the first portion 300 of the distal end 206 with the solenoid tube 136 fully inserted into the housing 108, for example. In some examples, the housing 108 has an exterior surface in a form of a hexagonal shape, and may comprise plastic, metal (e.g., steel), or a combination of materials.

Figure 7:
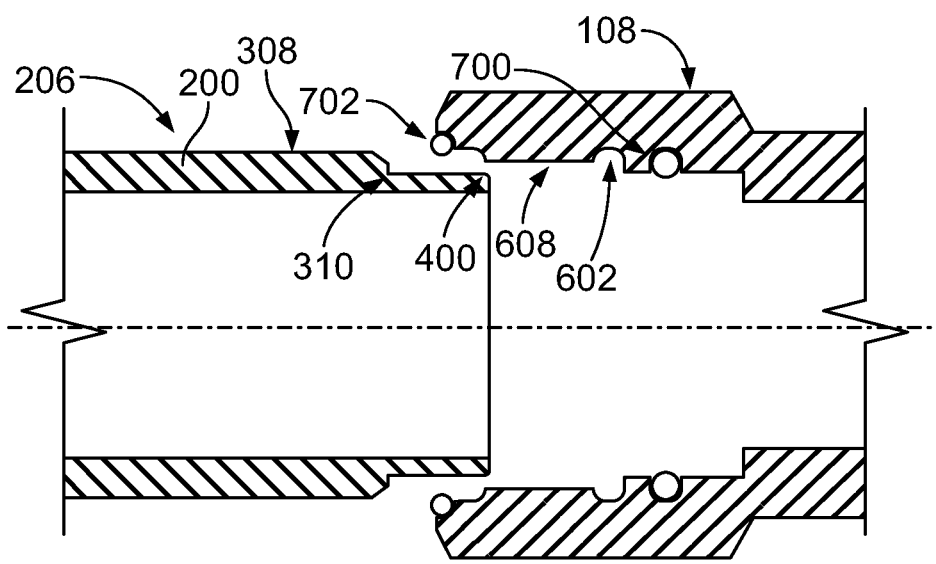
FIG. 7 illustrates a cross-sectional view of a distal end of a solenoid tube being inserted into a housing, in accordance with an example implementation.
Figure 8:
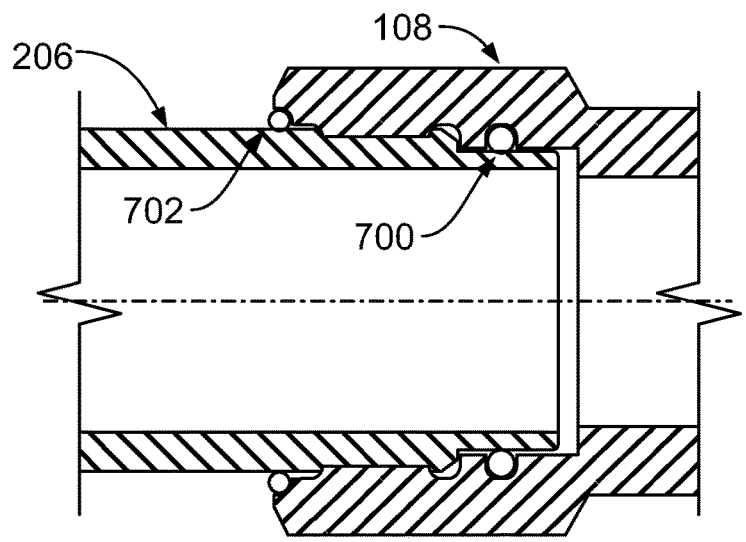
FIG. 8 illustrates a cross-sectional view of a distal end a solenoid tube inserted into a housing, in accordance with an example implementation.

FIG. 7 illustrates a cross-sectional view of the distal end 206 being inserted into the housing 108, in accordance with an example implementation. FIG. 8 illustrates a cross-sectional view of the distal end 206 inserted into the housing 108, in accordance with an example implementation.

As shown in FIGS. 7 and 8, the distal end 206 of the solenoid tube 136 is inserted and screwed into the housing 108 up to a point longitudinally along the distal end 206 (e.g., along the second portion 304 of the distal end 206) such that the locating shoulder 310 of the distal end 206 abuts the housing locating shoulder 602 of the housing 108. Threads of the threaded region 308 on the second portion 304 can extend longitudinally along the second portion 304 from the locating shoulder 310 to the point.

In some examples, a seal 700 (e.g., an O-ring) is positioned in the groove 614 disposed in the interior peripheral surface 604 of the housing 108 and adjacent the housing locating shoulder 602. The seal 700 is positioned circumferential to the first portion 300 of the distal end 206 of the solenoid tube 136 with the solenoid tube 136 inserted into the housing 108, as shown in FIG. 8.

In some examples, a back-up ring may be added to the assembly. For example, a backup ring may be positioned in the groove 614 and take the place of the seal 700. The groove 614 may also be wider so that the groove 614 can accommodate an O-ring seal (e.g., the seal 700) next to the back-up ring, for example.

In additional examples, a seal 702 (e.g., an O-ring) is positioned in the recess 616 disposed in the interior peripheral surface 604 of the housing 108 and adjacent the opening 618 of the housing 108. The seal 702 is positioned circumferential to the second portion 304 of the distal end 206 of the solenoid tube 136 with the solenoid tube 136 inserted into the housing 108.

In some examples, thickness of the housing locating shoulder 602 or the material from which the housing locating shoulder 602 is made render the housing locating shoulder 602 flexible or compliant. As such, when subjected to pressure above a threshold by the pressurized fluid, the housing locating shoulder 602 can deform to maintain a predetermined contact force between the housing 108 and the distal end 206 of the solenoid tube 136. Thus, when the valve 100 is under pressure, the housing locating shoulder 602 can flex to maintain a high contact force between the solenoid tube 136 and the housing 108 to prevent un-torqueing or backing-out of the solenoid tube 136, for example.

Figure 9:
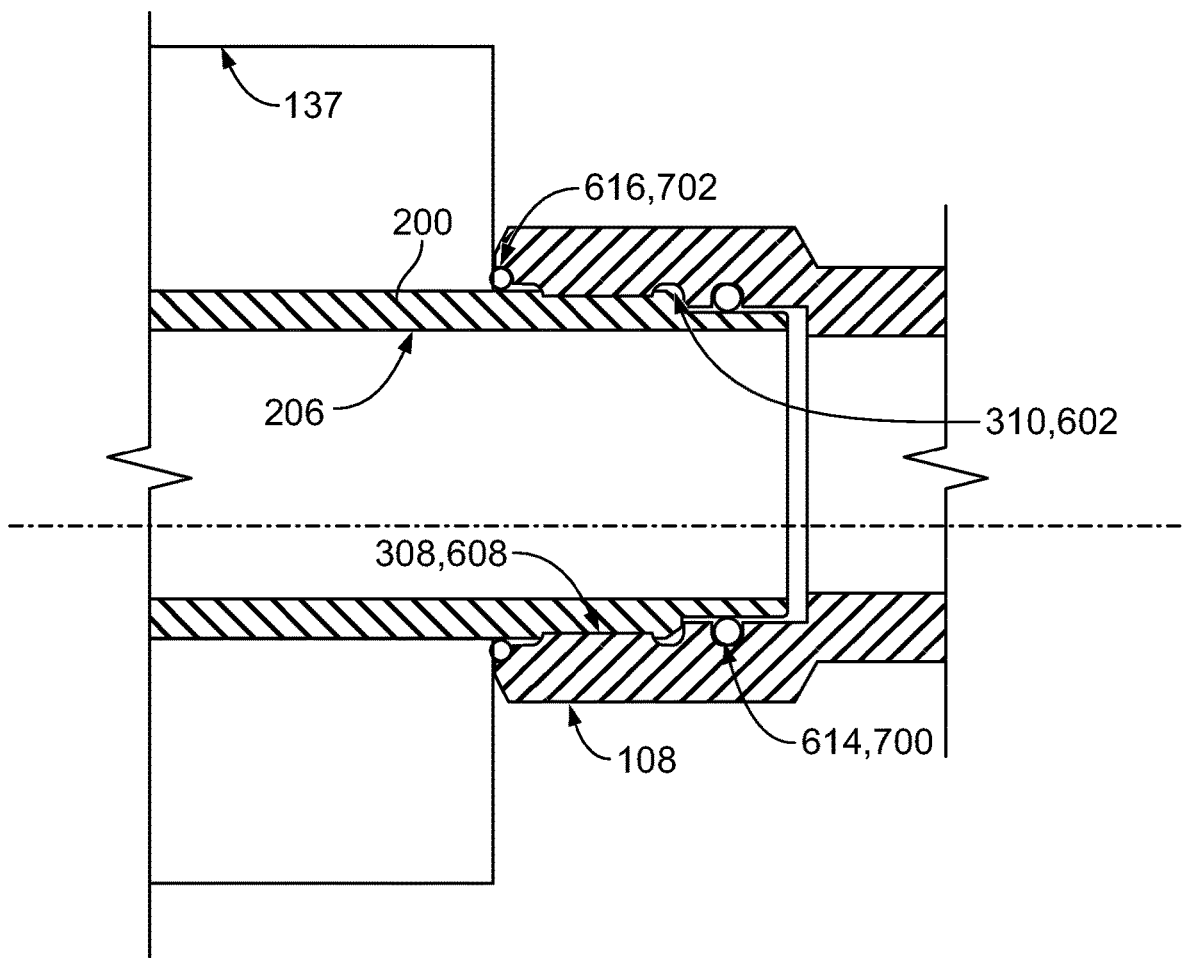
FIG. 9 illustrates a cross-sectional view of a solenoid coil mounted to a solenoid tube, in accordance with an example implementation.

FIG. 9 illustrates a cross-sectional view of the solenoid coil 137 mounted to the solenoid tube 136, in accordance with an example implementation. The distal end 206 of the solenoid tube 136 is inserted into the housing 108 as shown in FIG. 9 and the solenoid coil 137 is positioned over the cylindrical body 200 of the solenoid tube 136 and abutting the housing 108. The solenoid coil 137 can slide over the cylindrical body 200 and abut the housing 108 at the distal end 206. The seal 702 can be or can include an O-ring seal that may protect the threads and a volume or space between the cylindrical body 200 and the solenoid coil 137 from moisture and contaminants, for example.

Figure 10:
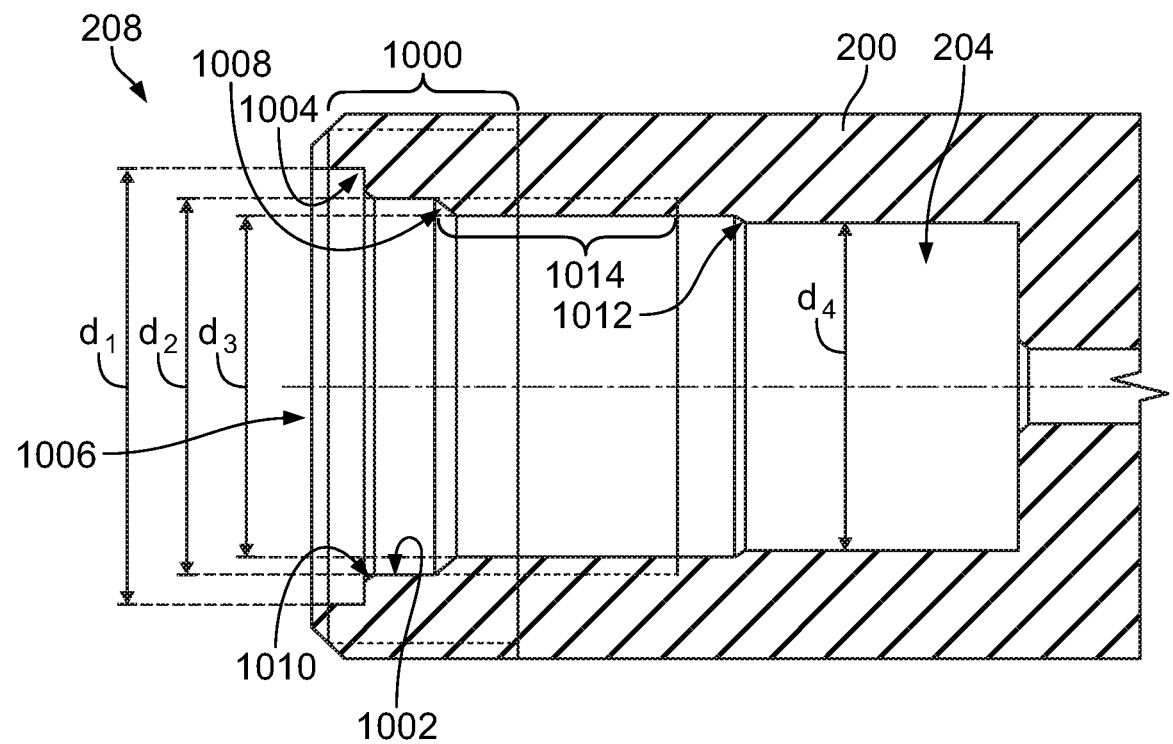
FIG. 10 illustrates a cross-sectional view of a proximal end of a solenoid tube, in accordance with another example implementation.

FIG. 10 illustrates a cross-sectional view of the proximal end 208 of the solenoid tube 136, in accordance with an example implementation. The proximal end 208 is configured to interface with a variety of different components or mechanisms to impute different functionalities to the valve 100.

The proximal end 208 has a threaded region 1000 disposed on an exterior peripheral surface of the cylindrical body 200 of solenoid tube 136. As mentioned above, the solenoid coil 137 is positioned over the cylindrical body 200 of the solenoid tube 136 and abutting the housing 108 at the distal end 206. After the solenoid coil 137 is positioned over the cylindrical body 200 abutting the housing 108 at the distal end 206, a nut (e.g., nut 1001 in FIGS. 1, 12-13) having internal threads can engage the threaded region 1000 of the proximal end 208. When fully engaged with the threaded region 1000, the nut operates as a stop or abutment for a proximal end of the solenoid coil 137. This way, the solenoid coil 137 is retained over the solenoid tube 136 between the housing 108 and the nut engaging the threaded region 1000.

An interior peripheral surface 1002 of the solenoid tube 136 at the proximal end 208 is stepped to provide several locating shoulders that operate as stops for components inserted into the second chamber 204 of the solenoid tube 136. For example, the proximal end 208 of the solenoid tube 136 includes or defines a first locating shoulder 1004 formed at a step from a first internal diameter "$d_1$" at an opening 1006 of the proximal end 208 to a second internal diameter "$d_2$."

The proximal end 208 of the solenoid tube 136 then defines a second locating shoulder 1008 formed as a chamfered step from the second internal diameter "$d_2$" to a third internal diameter "$d_3$." A chamfer angle at the chamfered step of the second locating shoulder 1008 can, for example, be about 45°.

Figure 11:
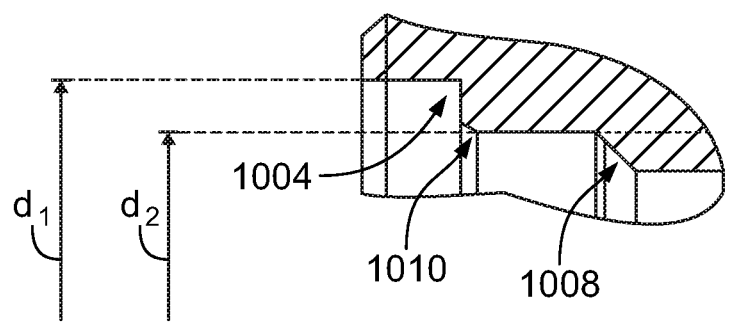
FIG. 11 illustrates a magnified view of detail "A" labelled in FIG. 10, in accordance with an example implementation.

FIG. 11 illustrates a magnified view of detail "A" labelled in FIG. 10, in accordance with an example implementation. As illustrated in FIG. 11, a circumferential transition step 1010 from the first internal diameter "$d_1$" to the second internal diameters "$d_2$" is chamfered (e.g., at an angle of about 30°).

Referring back to FIG. 10, the proximal end 208 of the solenoid tube 136 further defines a third locating shoulder 1012 formed as a chamfered step from the third internal diameter "$d_3$" to a fourth internal diameter "$d_4$." A chamfer angle at the chamfered step of the third locating shoulder 1012 can, for example, be about 30°.

Further, the interior peripheral surface 1002 of the proximal end 208 includes a threaded region 1014 disposed between the second locating shoulder 1008 and the third locating shoulder 1012. The threaded region 1014 is configured to threadedly engage with corresponding threads disposed on an exterior surface of a component being inserted into the second chamber 204 to couple the component to the solenoid tube 136. The locating shoulders 1004, 1008, and 1012 and the circumferential transition step 1010 can mate with corresponding features of the exterior surface of the component being inserted to enable alignment and coupling of the component with the solenoid tube 136. Further, chamfered surfaces of the locating shoulders 1008, 1012 and the circumferential transition step 1010 can facilitate insertion of the component inside the solenoid tube 136.

Referring back to FIG. 2, the pole piece 205 separates the first chamber 202 from the second chamber 204 as mentioned above. Further, the pole piece 205 defines a channel 210 therethrough. In other words, an interior peripheral surface of the solenoid tube 136 at or through the pole piece 205 forms the channel 210, which fluidly couples the first chamber 202 to the second chamber 204. As such, pressurized fluid provided to the first chamber 202 is communicated through the channel 210 to the second chamber 204.

In examples, the channel 210 can be configured to receive a pin therethrough so as to transfer linear motion of one component in the second chamber 204 to another component in the chamber 202 and vice versa. As such, the channel 210 can include chamfered circumferential surfaces at its ends (e.g., an end leading into the first chamber 202 and another end leading into the second chamber 204) to facilitate insertion of such a pin therethrough.

Referring back to FIG. 1, the solenoid tube 136 is configured to house a plunger or armature 138 in the first chamber 202. The armature 138 defines therein a longitudinal channel 140. The armature 138 also defines an annular internal groove 141 on an interior peripheral surface of the armature 138, where the annular internal groove 141 is formed as a recessed portion from the longitudinal channel 140 and is configured to receive an enlarged proximal end 142 of the second poppet 120. With this configuration, the second poppet 120 is coupled to the armature 138, and thus, axial motion of the armature 138 causes the second poppet 120 to move axially as well.

As mentioned above, the solenoid tube 136 includes the pole piece 205 formed as a protrusion from an interior peripheral surface of the solenoid tube 136. The pole piece 205 is separated from the armature 138 by a gap 146.

Further, the valve 100 includes a setting spring 143 disposed in the longitudinal channel 140 and has a proximal end resting against the pole piece 205 and a distal end resting against a protrusion 145 formed in the interior peripheral surface of the armature 138. The armature 138 is movable, whereas the pole piece 205 is stationary along with the solenoid tube 136. As such, the setting spring 143 applies a biasing force on the armature 138, and thus on the second poppet 120, in a closing distal direction (e.g., to the right in FIG. 1). As a result of the biasing force applied by the setting spring 143 on the second poppet 120, the second poppet 120 remains seated at the seat 122 when the valve 100 is unactuated.

When an electric current is provided through the windings of the solenoid coil 137, a magnetic field is generated. The pole piece 205 directs the magnetic field through the gap 146 toward the armature 138, which is movable and is attracted toward the pole piece 205. In other words, when an electric current is applied to the solenoid coil 137, the generated magnetic field forms a north and south pole in the pole piece 205 and the armature 138, and a solenoid force is generated and attracts the pole piece 205 and the armature 138 toward each other. Because the pole piece 205 is fixed as part of the solenoid tube 136, whereas the armature 138 is movable, the armature 138 can traverse the gap 146 toward the pole piece 205 when the solenoid force overcomes the biasing force of the setting spring 143.

When the solenoid force overcomes the biasing force of the setting spring 143, the armature 138 and the second poppet 120 move axially toward the pole piece 205 against the biasing force of the setting spring 143, and the second poppet 120 is thus unseated off the seat 122. As a result, fluid in the chamber 124 is allowed to flow through the longitudinal channel 129, thereby pushing the ball 128 and the roll pin 126, and then flowing to the first port 112. The first port 112 may be fluidly coupled to a low pressure reservoir or tank. Thus, the pressure level in the chamber 124 is reduced as the fluid is vented from the chamber 124 through the first port 112 to the tank.

The second port 114 may be fluidly coupled to a source of pressurized fluid (e.g., a pump or accumulator combined with a pressure setting valve such as an electrohydraulic pressure relief valve). The pressurized fluid received at the second port 114 applies a force on a tapered exterior peripheral surface of a nose or distal end of the first poppet 116. Because of the difference in pressure level between the fluid received at the second port 114 and the fluid in the chamber 124, the first poppet 116 is moved axially in a proximal direction (e.g., to the left in FIG. 1) and is unseated off the seat 118. Thus, a gap or flow area is formed between the exterior surface of the first poppet 116 and the interior peripheral surface of the sleeve 110, thus allowing fluid to flow from the second port 114 around the first poppet 116 through the flow area to the first port 112.

The solenoid tube 136 is configured to accommodate a variety of components or mechanisms in the second chamber 204. As a first example, the solenoid tube 136 can accommodate the pull-type manual actuator 106 in the second chamber 204 as shown in FIG. 1.

In some cases, the pull-type solenoid actuator 104 might fail, might become inoperable, or might not operate as expected. In these cases, sending an electric signal to the windings of the solenoid coil 137 might not cause the first poppet 116 to be unseated. As a safety feature, it may be desirable for the valve 100 to include the pull-type manual actuator 106 that allows an operator to manually override the pull-type solenoid actuator 104. Specifically, the pull-type manual actuator 106 may allow the operator to manually pull the armature 138 toward the pole piece 205 to unseat the second poppet 120, which causes the first poppet 116 to be unseated, thus allowing fluid to be relieved and flow from the second port 114 to the first port 112.

The pull-type manual actuator 106 includes a knob 148 that defines a longitudinal cylindrical cavity therein. A sleeve 150 is fixedly disposed partially in the longitudinal cylindrical cavity defined within the knob 148 and partially in the second chamber 204 of the solenoid tube 136. Particularly, the sleeve 150 can include a threaded region 152 that engages the threaded region 1014 on the interior peripheral surface of the solenoid tube 136 to couple the sleeve 150 to the solenoid tube 136. Longitudinal depth of threads of the threaded region 1014 can determine how far the sleeve 150 is inserted within the second chamber 204 of the solenoid tube 136.

Further, the sleeve 150 can include a respective shoulder 153 protruding from the exterior peripheral surface of the sleeve 150 and formed as a rim. The shoulder 153 can mate with the locating shoulder 1004 of the proximal end 208 of the solenoid tube 136 when the sleeve 150 is inserted in the second chamber 204.

Further, the sleeve 150 defines a respective longitudinal cylindrical cavity therein and houses a piston 154 that is axially movable within the longitudinal cylindrical cavity of the sleeve 150. The valve 100 further includes a spring 156 disposed in a chamber formed between the interior peripheral surface of the sleeve 150 and the exterior peripheral surface of the piston 154. A proximal end of the spring 156 rests against a shoulder 157 formed on the interior surface of the sleeve 150, and a distal end of the spring 156 rests against the piston 154. Thus, the spring 156 biases the piston 154 in the distal direction (e.g., to the right in FIG. 1).

The piston 154 defines therein a respective longitudinal cylindrical cavity that houses a pin 158. The piston 154 further defines a shoulder 159 against which the pin 158 rests. Specifically, the pin 158 may define an area with an enlarged diameter that rests against the shoulder 159, such that forces applied to the pin 158 in the proximal direction are transferred to the piston 154 via the shoulder 159.

The pin 158 extends through the channel 210 formed in the pole piece 205 of the solenoid tube 136. The pin 158 has an enlarged distal end 160 disposed in a recessed area of the interior peripheral surface of the armature 138 formed as a result of the protrusion 145. With this configuration, if the pin 158 is moved axially in a proximal direction (e.g., to the left in FIG. 1), the enlarged distal end 160 of the pin 158 engages the protrusion 145 of the armature 138, thus causing the armature 138 to move axially along with the pin 158. As described above, axial motion of the armature 138 causes the second poppet 120 to move axially therewith due to the engagement of the enlarged proximal end 142 of the second poppet 120 with the armature 138. As such, the pin 158 is indirectly coupled to the second poppet 120 via the armature 138.

The knob 148 has a threaded blind hole 162 configured to receive a set screw 164 that then engages and grabs the pin 158. With this configuration, as the knob 148 is pulled in an axial direction (e.g., in the proximal direction to the left in FIG. 4), the pin 158 also moves axially along with the knob 148.

Thus, when an operator pulls the knob 148 in the proximal direction, the pin 158 is pulled therewith, and the pin 158 interacts with the piston 154 via the shoulder 159 to cause the piston 154 to move axially with the knob 148 and the pin 158 against the force of the spring 156. The pin 158 in turn moves the armature 138 and the second poppet 120 coupled thereto in the proximal direction.

As described above, when the second poppet 120 is unseated fluid flows from the chamber 124 though the longitudinal channel 129, pushing the ball 128 and the roll pin 126, to flow to the first port 112. As mentioned above, the pressurized fluid received at the second port 114 applies a force on a tapered exterior peripheral surface of a nose or distal end of the first poppet 116. Because of the difference in pressure level between the fluid received at the second port 114 and the fluid in the chamber 124, the first poppet 116 is moved axially in a proximal direction (e.g., to the left in FIG. 1) and is unseated off the seat 118. Thus, a gap or flow area is formed between the exterior surface of the first poppet 116 and the interior peripheral surface of the sleeve 110, thus allowing fluid to flow from the second port 114 around the first poppet 116 through the flow area to the first port 112. With this configuration, pulling the knob 148 amounts to manual actuation of the valve 100.

As such, the solenoid tube 136 can be configured to receive the pull-type manual actuator 106 to allow for manual actuation or manual override actuation of the valve 100 if configuring the valve 100 in that manner is desirable. The solenoid tube 136 can also be configured to receive other components or mechanisms to perform other operations. For example, as described below, the solenoid tube 136 can accommodate a manual adjustment actuator or a sensor in the second chamber 204.

Figure 12:
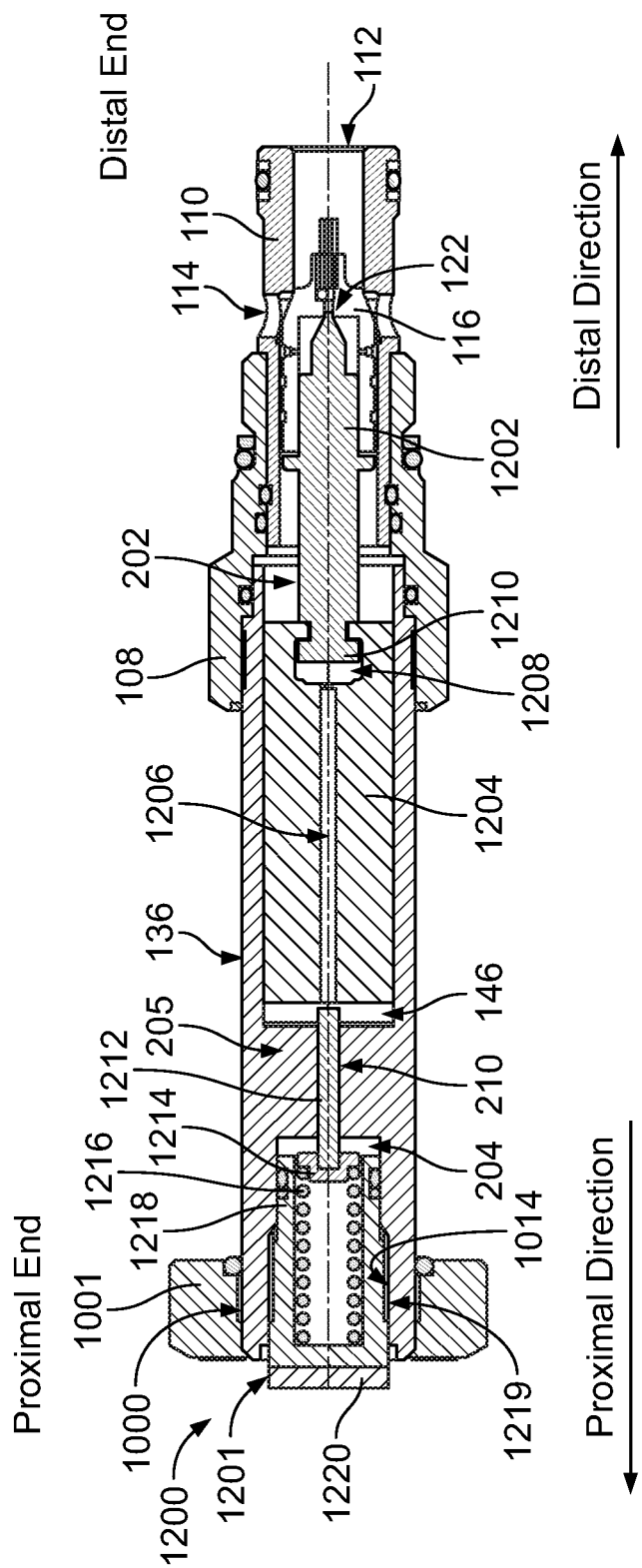
FIG. 12 illustrates a valve having a manual adjustment mechanism disposed in a second chamber of a solenoid tube, in accordance with an example implementation.

FIG. 12 illustrates a valve 1200 having a manual adjustment mechanism 1201 disposed in the second chamber 204 of the solenoid tube 136, in accordance with an example implementation. The valve 1200 is similar to the valve 100, and therefore identical components of both valves 100, 1200 are designated with the same reference numbers. The solenoid coil 137 is not shown in FIG. 12 to reduce visual clutter in the drawings.

The valve 1200 includes a second poppet 1202 that is similar to the second poppet 120. The valve 1200 also has an armature 1204 similar to the armature 138 and received in the first chamber 202 of the solenoid tube 136. The armature 1204 defines therein a longitudinal channel 1206 to communicate fluid from the first chamber 202 to the gap 146. The armature 1204 also defines an annular internal groove 1208 on an interior peripheral surface of the armature 1204, where the annular internal groove 1208 is formed as a recessed portion from the longitudinal channel 1206 and is configured to receive an enlarged proximal end 1210 of the second poppet 1202. With this configuration, the second poppet 1202 is coupled to the armature 1204, and thus, axial motion of the armature 1204 causes the second poppet 1202 to move axially as well.

As described above with respect to the valve 100, the setting spring 143 is configured to apply a biasing force on the armature 138, and thus on the second poppet 120 to keep the second poppet 120 seated at the seat 122 when the valve 100 is in unactuated. When an electric current is provided to the solenoid coil 137, a solenoid force is applied to the armature 138 and the second poppet 120 in the proximal direction. When the solenoid force overcomes the biasing force of the setting spring 143, the armature 138 and the second poppet 120 can move axially toward the pole piece 205 against the biasing force of the setting spring 143.

As such, the biasing force of the setting spring 143 determines the setting of the valve 100, where the setting is the command signal to the solenoid coil 137 at which the valve 100 "cracks" open, i.e., the command signal at which the first poppet 116 is unseated to modulate fluid flow from the second port 114 to the first port 112. A spring rate of the setting spring 143 and its initial length determine a magnitude of the biasing force that the setting spring 143 applies to the armature 138, and thus determine the setting of the valve 100. Further, because the spring rate and initial length of the setting spring 143 is unchangeable with the configuration of the valve 100, the setting of the valve 100 is not adjustable.

Referring now to the valve 1200 in FIG. 12, the manual adjustment mechanism 1201 is configured to allow for adjusting the setting of the valve 1200. The manual adjustment mechanism 1201 includes a pin 1212 disposed through the channel 210 of the pole piece 205. The pin 1212 is coupled to a spring cap 1214 that interfaces with a setting spring 1216 of the valve 1200. The setting spring 1216 applies a biasing force on the pin 1212 via the spring cap 1214, and in turn the pin 1212 interacts with the armature 1204 such that the biasing force of the setting spring 1216 is transferred to the armature 1204. The armature 1204 in turn transfers the biasing force to the second poppet 1202 to bias the second poppet 1202 toward its seated position at the seat 122. As such, the setting spring 1216 is similar to the setting spring 143 in that it applies the biasing force that is to be overcome with the solenoid force to open the valve 1200. The valve 1200, however, differs from the valve 100 in that the biasing force of the setting spring 1216 is adjustable.

Particularly, the setting spring 1216 is disposed within a cavity of an adjustment piston or adjustment sleeve 1218 disposed, at least partially, in the second chamber 204. The adjustment sleeve 1218 includes a threaded region 1219 on an exterior surface of the adjustment sleeve 1218, where the threaded region 1219 is configured to engage with the threaded region 1014 disposed on the interior peripheral surface of the solenoid tube 136 to couple the adjustment sleeve 1218 to the solenoid tube 136. Longitudinal depth of threads of the threaded region 1014 can determine how far the adjustment sleeve 1218 can be inserted within the second chamber 204 of the solenoid tube 136.

The longitudinal or axial position of the adjustment sleeve 1218 is determined by how many threads of the threaded region 1219 engage with internal threads of the threaded region 1014. Further, the adjustment sleeve 1218 is axially movable within the second chamber 204 of the solenoid tube 136. For instance, an adjustment screw 1220 can be coupled to the adjustment sleeve 1218 such that if the adjustment screw 1220 is rotated in a first rotational direction (e.g., clockwise) the adjustment sleeve 1218 moves in the distal direction (e.g., to the right in FIG. 12) by engaging more threads of the threaded region 1219 with more internal threads of the threaded region 1014. If the adjustment screw 1220 is rotated in a second rotational direction (e.g., counter-clockwise) the adjustment sleeve 1218 is allowed to move in the proximal direction (e.g., to the left in FIG. 12) by disengaging some threads of the threaded region 1219 with respective internal threads of the threaded region 1014.

While a respective distal end of the setting spring 1216 is coupled to the spring cap 1214, a respective proximal end of the setting spring 1216 rests against an interior surface of the adjustment sleeve 1218. As such, axial motion of the adjustment sleeve 1218 results in a change in an initial compressed length of the setting spring 1216, and thus a change in a preload on the setting spring 1216. As a result, the biasing force that the setting spring 1216 on the armature 1204 and the setting of the valve 1200 are changed. As such, the solenoid tube 136 enables the valve 1200 to be configured to have an adjustable setting by being able to include the manual adjustment mechanism 1201.

Figure 13:
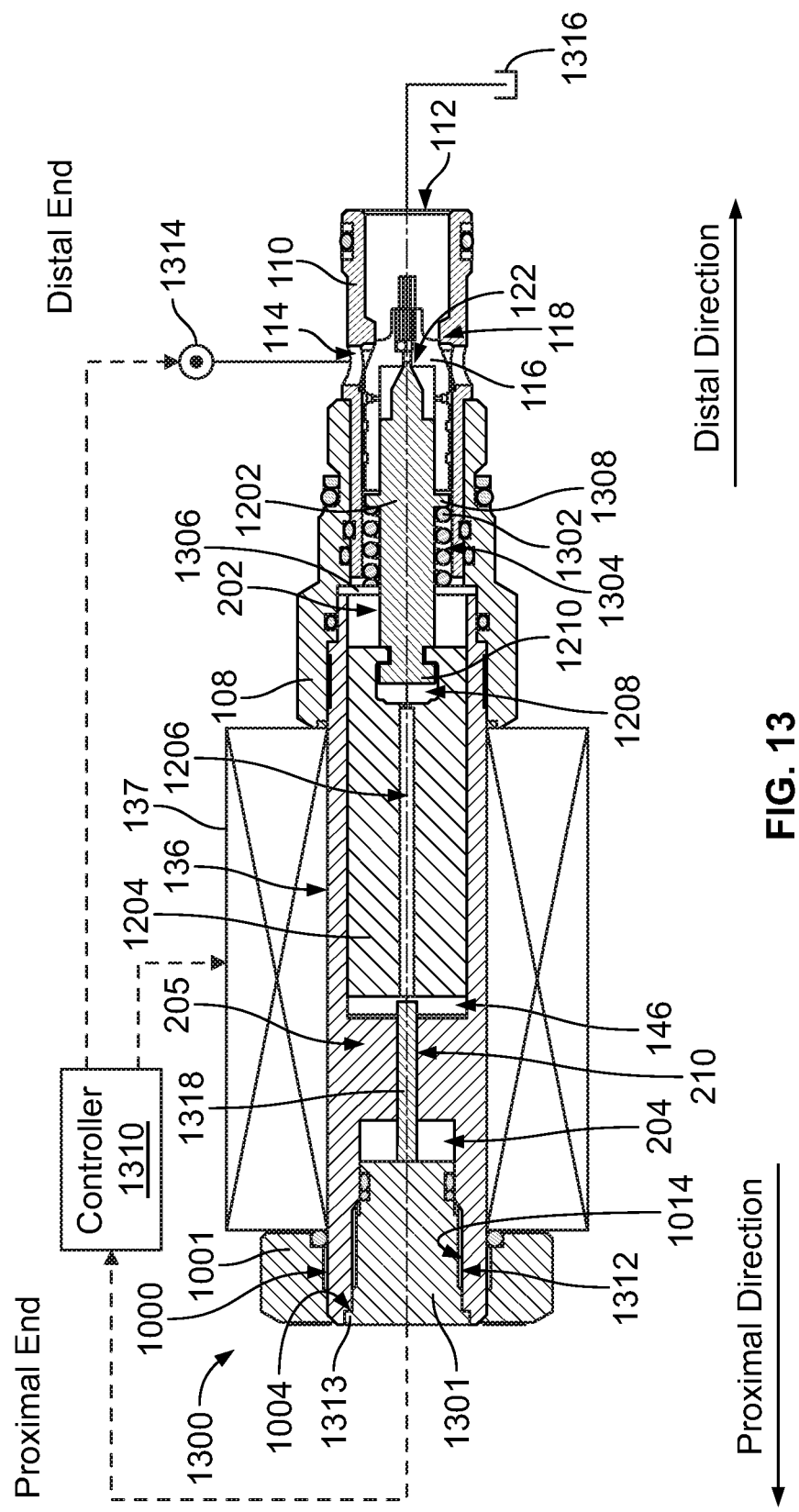
FIG. 13 illustrates a valve having a sensor disposed in a second chamber of a solenoid tube, in accordance with an example implementation.

FIG. 13 illustrates a valve 1300 having a sensor 1301 disposed in the second chamber 204 of the solenoid tube 136, in accordance with an example implementation. The valve 1300 is similar to the valve 1200, and therefore identical components of the valve 1200, 1300 are designated with the same reference numbers.

Rather than the setting spring 143 of the valve 100 or the setting spring 1216 of the valve 1200, the valve 1300 includes a setting spring 1302 disposed in a chamber 1304 defined within the sleeve 110 and the housing 108. The setting spring 1302 is disposed around an exterior peripheral surface of the second poppet 120 between a spring support member 1306 fixedly disposed in the longitudinal cylindrical cavity of the housing 108 and a shoulder or protrusion 1308 formed on the exterior surface of the second poppet 120. The setting spring 1302 applies a biasing force on the protrusion 1308, and thus on the second poppet 120, in the closing distal direction (e.g., to the right in FIG. 13).

To actuate the valve 1300, a controller 1310 of the hydraulic system that includes the valve 1300 sends a command signal to the solenoid coil 137 to generate a solenoid force on the armature 1204. When a magnitude of the command signal reaches a setting of the valve 1300 such that the solenoid force overcomes the biasing force of the setting spring 1302, the second poppet 120 moves off the seat 122 to open the valve 1300.

Rather than the pull-type manual actuator 106 or the manual adjustment mechanism 1201, the valve 1300 includes the sensor 1301 disposed in the second chamber 204 of the solenoid tube 136. In an example, an entire housing or body or of the sensor 1301 can be disposed in the second chamber 204 and a surface of the body can be exposed to an outside of the solenoid tube 136 to provide access (e.g., wires) to the sensor 1301. In another example, a portion of the body of the sensor 1301 can be disposed in (i.e., the body of the sensor 1301 can be partially disposed within) the second chamber 204 and partially disposed outside the solenoid tube 136. In another example, a portion of the sensor 1301 that includes a sensing element (e.g., a strain gauge) can be disposed within the second chamber 204, whereas another portion of the body of the sensor 1301 can extend from the second chamber 204 (e.g., extend outside the second chamber 204 and the solenoid tube 136). In other examples, the sensor 1301 can be disposed entirely within the second chamber 204, and the cylindrical body 200 could have an inlay at the second chamber 204 to provide access to the sensor 1301 (e.g., wires).

The sensor 1301 can include a threaded region 1312 disposed on an exterior peripheral surface of the body of the sensor 1301 and the threaded region 1312 is configured to engage the threaded region 1014 of the solenoid tube 136 to couple the sensor 1301 to the solenoid tube 136. Further, the sensor 1301 can include one or more locating shoulders configured to mate with locating shoulders of the solenoid tube 136 at its proximal end 208. For instance, the sensor 1301 can include a locating shoulder 1313 protruding from the exterior peripheral surface of the sensor 1301 and formed as a rim configured to mate with the locating shoulder 1004 of the proximal end 208 of the solenoid tube 136 when the sensor 1301 is inserted in the second chamber 204.

In an example, the sensor 1301 can be a pressure sensor configured to measure pressure level of fluid in the second chamber 204 and provide sensor information indicative of the measurement to the controller 1310. Particularly, a hydraulic system that includes the valve 1300 can have a source 1314 of pressurized fluid providing pressurized fluid to the second port 114, while the first port 112 can be fluidly coupled to another hydraulic component or to a tank 1316. Pressurized fluid at the second port 114 can be communicated through unsealed spaces around an exterior surface of the first poppet 116 and the second poppet 1202 to the chamber 1304. Fluid can then be communicated between the second poppet 1202 and the spring support member 1306 to the first chamber 202 of the solenoid tube 136. Fluid is then communicated through the longitudinal channel 1206 of the armature 1204 and then through the channel 210 of the pole piece 205 to the second chamber 204 where the sensor 1301 is disposed. As such, the sensor 1301 is subjected to fluid having the pressure level of fluid received at the second port 114 and can provide sensor information indicative of such pressure level to the controller 1310.

In another example, the sensor 1301 can be a position sensor. In this example, the valve 1300 can include a pin 1318 coupled to the sensor 1301 and disposed through the channel 210 of the pole piece 205. The pin 1318 can be configured to contact the armature 1204, which is coupled to the second poppet 1202, which can be in contact with the first poppet 116 when the second poppet 1202 is seated at the seat 122. As such, position of the second poppet 1202 and/or the first poppet 116 can be indicated by position of the pin 1318. The sensor 1301 can, for example, be a linear variable differential transformer (LVDT) sensor or a magnetic Hall-Effect sensor that can generate a signal indicative of a position of the pin 1318 relative to the sensor 1301. With this configuration, the sensor 1301 can measure position of the second poppet 1202 and/or the first poppet 116 and provide sensor information indicative of the measurement to the controller 1310.

In another example, the sensor 1301 can be a combined pressure and position sensor configured to provide sensor information indicative pressure level of fluid received at the second port 114 as well as position of the second poppet 1202 and/or the first poppet 116 to the controller 1310.

The controller 1310 can then control the valve 1300, or other components of the hydraulic system that includes the valve 1300, based on the sensor information. For instance, the valve 1300 can be a proportional valve where a position of the first poppet 116 can be varied proportionally with the command signal provided to the solenoid coil 137. The controller 1310 can implement a closed-loop feedback control to accurately control axial position of the first poppet 116 so as to control the fluid flow rate from the second port 114 to the first port 112 for a given pressure drop therebetween.

In another example, the controller 1310 can use sensor information from the sensor 1301 for diagnostic purposes. For instance, as mentioned above, the sensor 1301 can provide to the controller 1310 information indicating position of the first poppet 116. As such, if controller 1310 has sent a command signal to the solenoid coil 137, but the first poppet 116 has not moved as expected (i.e., moved to a position corresponding to the command signal), then the controller 1310 can determine that a fault has occurred. The controller 1310 can also determine whether the first poppet 116 is seated at the seat 118 and thus whether the valve 1300 is in a closed position.

Further, the source 1314 of pressurized fluid can, for example, be a pump configured to receive fluid from the tank 1316, pressurize the fluid, and then provide the pressurized fluid to the second port 114. Such pump can be a fixed displacement pump, a variable displacement pump, or a load-sensing variable displacement pump, as examples. A relief valve (e.g., electrohydraulic pressure relief valve that is not shown) can be coupled to the source 1314 of pressurized fluid to set a particular pressure level for fluid provided by the source 1314 to the second port 114. The controller 1310 can send a command signal to the relief valve to set the pressure level based on pressure sensor information provided by the sensor 1301.

Figure 14:
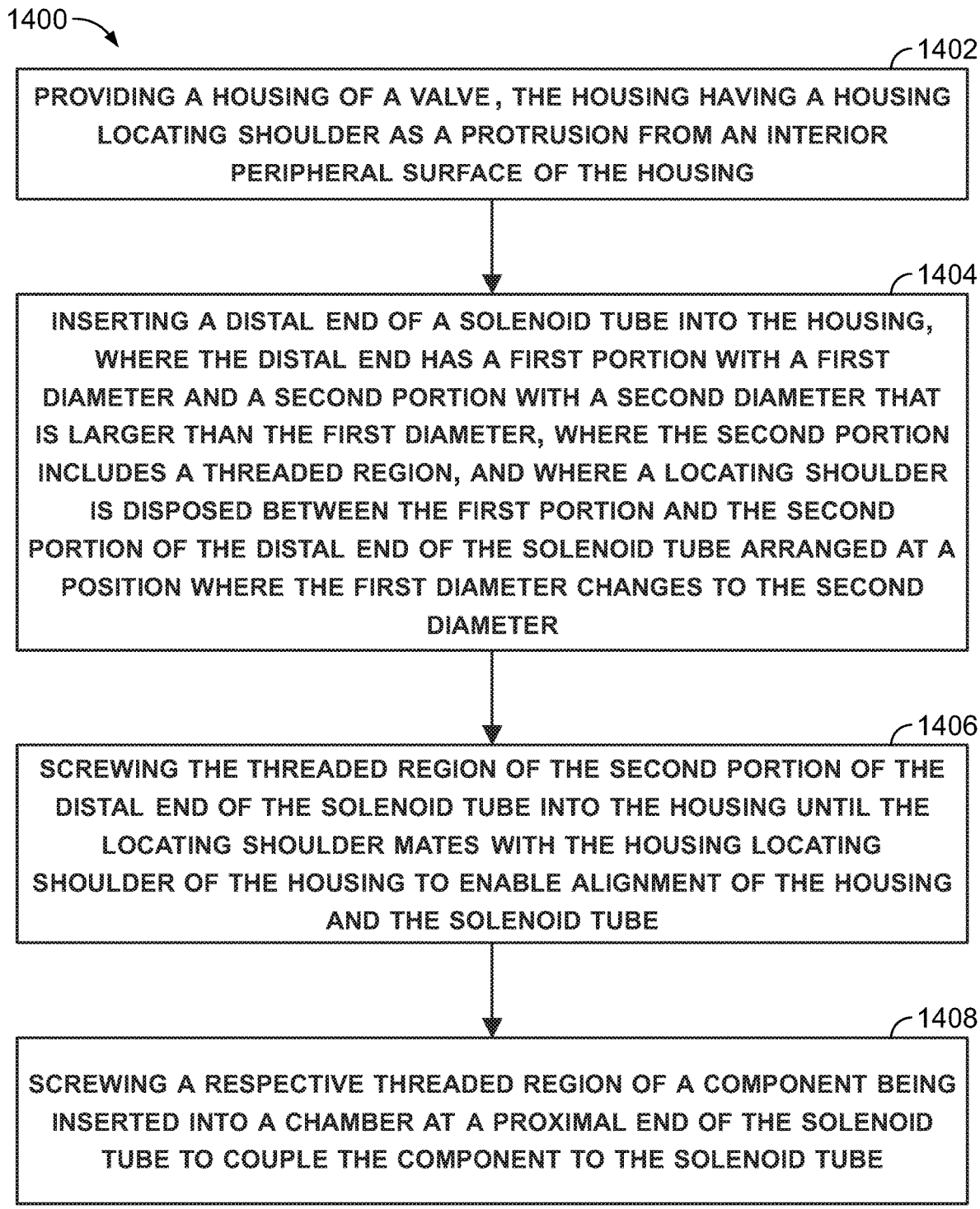
FIG. 14 is a flowchart of a method of assembling a valve, in accordance with an example implementation.

FIG. 14 illustrates a flowchart of a method 1400 of assembling a valve, in accordance with an example implementation. The method 1400 shown in FIG. 14 presents an example of a method that could be used with any of the valves (e.g., the valves 100, 1200, or 1300) described above and shown in FIGS. 1-13 that includes the solenoid tube 136. The method 1400 may include one or more operations, functions, or actions as illustrated by one or more of blocks 1402-1408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 1402, the method 1400 includes providing the housing 108 of a valve (e.g., the valve 100, 1200, or 1300), the housing 108 having the housing locating shoulder 602 as a protrusion from the interior peripheral surface 604 of the housing 108. The term "providing" as used herein, and for example with regard to the housing 108, includes any action to make the housing 108 available for use, such as bringing the housing 108 to an apparatus or to a work environment for further processing of the housing 108 (e.g., mounting other components, etc.).

At block 1404, the method 1400 includes inserting the distal end 206 of the solenoid tube 136 into the housing 108. The solenoid tube 136 includes the cylindrical body 200 defining therein the first chamber 202 on the distal side of the cylindrical body 200 and the second chamber 204 on the proximal side of the cylindrical body 200. The solenoid tube 136 includes the pole piece 205 formed as a protrusion from an interior peripheral surface of the cylindrical body 200. The pole piece 205 separates the first chamber 202 from the second chamber 204. The solenoid tube 136 has the distal end 206 configured to be coupled to the housing 108 and the proximal end 208 configured to be coupled to a variety of components to impute different functionalities to a given valve.

The distal end 206 has the first portion 300 with the first diameter 302 and the second portion 304 with the second diameter 306 that is larger than the first diameter 302. The second portion 304 includes the threaded region 308. The distal end 206 further includes the locating shoulder 310 disposed between the first portion 300 and the second portion 304 of the distal end 206 of the solenoid tube 136 and arranged at a position where the first diameter 302 changes to the second diameter 306.

The proximal end 208 includes the threaded region 1014 disposed on the interior peripheral surface 1002 between the second locating shoulder 1008 and the third locating shoulder 1012. The proximal end 208 further has the threaded region 1000 disposed on an exterior peripheral surface of the solenoid tube 136. As mentioned above, the solenoid coil 137 is positioned over the cylindrical body 200 of the solenoid tube 136 and abutting the housing 108 at the distal end 206. After the solenoid coil 137 is positioned over the cylindrical body 200 abutting the housing 108 at the distal end 206, the nut 1001 having internal threads can engage the threaded region 1000 of the proximal end 208.

At block 1406, the method 1400 includes screwing the threaded region 308 of the second portion 304 of the distal end 206 of the solenoid tube 136 into the housing 108 until the locating shoulder 310 mates with the housing locating shoulder 602 of the housing 108 to enable alignment of the housing 108 and the solenoid tube 136.

At block 1408, the method 1400 includes screwing a respective threaded region (e.g., the threaded region 152, 1219, and 1312) of a component being inserted into the second chamber 204 of the solenoid tube 136 at the proximal end 208 to couple the component to the solenoid tube 136. The component can further include at least one locating shoulder (e.g., the shoulder 153 or 1313) that mates with one of the locating shoulders 1004, 1008, and 1012 of the proximal end 208. The component can be the pull-type manual actuator 106, the manual adjustment mechanism 1201, or the sensor 1301, as examples.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
   a main valve section comprising: (i) a housing having threads disposed on an interior peripheral surface of the housing, and (ii) a movable element configured to move axially within the housing;
   a solenoid actuator comprising: (i) a solenoid tube having a cylindrical body, wherein the cylindrical body comprises a first threaded region formed on an exterior peripheral surface of the cylindrical body and disposed at a distal end thereof, wherein the first threaded region engages the threads of the housing to couple the solenoid tube to the housing, wherein the cylindrical body comprises a second threaded region formed on a respective interior peripheral surface of the cylindrical body and disposed at a proximal end thereof, wherein the cylindrical body comprises a pole piece formed as a protrusion from the respective interior peripheral surface of the cylindrical body, wherein the pole piece divides a hollow interior of the cylindrical body into a first chamber and a second chamber, and wherein the pole piece defines a channel therethrough, such that the channel fluidly couples the first chamber to the second chamber, (ii) an armature disposed in the first chamber and configured to be coupled to the movable element of the main valve section, wherein majority of the armature is contained within the first chamber of the cylindrical body, such that the armature is movable axially within the first chamber, and (iii) a solenoid coil disposed about the exterior peripheral surface of the cylindrical body; and
   a manual actuator having: (i) a sleeve disposed, at least partially, in the second chamber of the cylindrical body of the solenoid tube, wherein the sleeve has respective threads disposed on a respective exterior peripheral surface of the sleeve, wherein the second threaded region of the cylindrical body of the solenoid tube engages the respective threads of the sleeve to couple the manual actuator to the solenoid tube, and a (ii) a pin disposed through the channel of the pole piece and configured to contact the armature.

2. The valve of claim 1, wherein the manual actuator includes:
   a knob having a longitudinal cylindrical cavity therein, wherein the sleeve is disposed in the longitudinal cylindrical cavity, wherein the knob is coupled to the pin such that as the knob is pulled in an axial direction, the pin, the armature in contact with the pin, and the movable element coupled to the armature move in the axial direction along with the knob.

3. The valve of claim 1, wherein the sleeve of the manual actuator is an adjustment sleeve that is axially movable in the second chamber, and wherein the manual actuator includes:
   a setting spring disposed in a cavity within the adjustment sleeve, such that a respective proximal end of the setting spring rests against an interior surface of the adjustment sleeve; and
   a spring cap to which a respective distal end of the setting spring is coupled, wherein the spring cap is coupled to the pin, such that axial motion of the adjustment sleeve within the second chamber changes length of the setting spring, thereby changing a biasing force applied by the setting spring on the armature via the pin.

4. The valve of claim 1, wherein the proximal end of the cylindrical body includes at least one locating shoulder defined on the interior peripheral surface of the cylindrical body, wherein the at least one locating shoulder mates with a respective shoulder on the sleeve of the manual actuator.

5. The valve of claim 1, wherein the proximal end of the cylindrical body includes a third threaded region disposed on the exterior peripheral surface of the cylindrical body, wherein the valve further comprises:
   a nut having internal threads engaging the third threaded region, wherein the nut is configured as a stop for the solenoid coil disposed about the exterior peripheral surface of the cylindrical body, such that the solenoid coil is retained between the nut and a respective proximal end of the housing.

6. The valve of claim 1, wherein the distal end of the cylindrical body includes: (i) a first portion having a first diameter and a second portion having a second diameter that is larger than the first diameter, wherein the first portion is inserted into the housing ahead of the second portion, and wherein the second portion includes the first threaded region, and (ii) a locating shoulder disposed between the first portion and the second portion and arranged at a position where the first diameter changes to the second diameter, and wherein the locating shoulder mates with a housing locating shoulder disposed on the interior peripheral surface of the housing of the main valve section.

7. The solenoid tube of claim 6, wherein the first portion includes a tapered end configured to abut an interior surface of the housing when the solenoid tube is inserted into the housing.

8. The valve of claim 6, wherein the housing comprises a groove disposed in the interior surface of the housing adjacent the housing locating shoulder, the valve further comprising:
 a seal positioned in the groove of the housing, wherein the seal is positioned circumferential to the first portion of the distal end of the cylindrical body.

9. The valve of claim 6, wherein the housing comprises a recess disposed in the interior surface of the housing, the valve further comprising a seal positioned in the recess of the housing and positioned circumferential to the second portion.

\* \* \* \* \*